United States Patent [19]
Stammreich

[11] 3,711,113
[45] Jan. 16, 1973

[54] VEHICLE SUSPENSION ARRANGEMENT

[76] Inventor: John C. Stammreich, 5521 Paraguay Drive, Buena Park, Calif. 90620

[22] Filed: Sept. 9, 1970

[21] Appl. No.: 70,654

[52] U.S. Cl............280/96.2 R, 280/95, 280/96.2 A
[51] Int. Cl. ................................................B62d 7/06
[58] Field of Search.........280/96.1, 96.2, 96.2 A, 95; 267/20 A

[56] References Cited

UNITED STATES PATENTS

| | | | |
|---|---|---|---|
| 2,299,241 | 10/1942 | Kumm | 280/96.2 R |
| 2,767,998 | 10/1956 | Powell | 280/96.2 R |
| 2,866,651 | 12/1958 | Powell | 280/96.2 R |
| 2,978,255 | 4/1961 | Rosenkrands | 267/20 A X |
| 2,096,969 | 10/1937 | Lemay | 280/96.2 R |

Primary Examiner—Benjamin Hersh
Assistant Examiner—John P. Silverstrim
Attorney—Henry M. Bissell

[57] ABSTRACT

A suspension system for a vehicle comprised of a guide plate having a plurality of guideways and a plurality of linkage arrangements pivotally mounted through such guideways and to such guide plate for allowing various pivot points of such linkage arrangements to rotate and travel relative to such guideways to control the camber of the tires of such vehicle during the vertical deflection of such tires and the roll of such vehicle. Either an open loop or a closed loop control circuit may be connected to the suspension system to provide for automatic control of the suspension system during roll.

36 Claims, 16 Drawing Figures

PATENTED JAN 16 1973 3,711,113

INVENTOR
JOHN STAMMREICH
BY Henry M. Bissell
ATTORNEY

INVENTOR
JOHN STAMMREICH
BY Henry M. Bissell
ATTORNEY

INVENTOR
JOHN STAMMREICH
BY Henry M. Bissell
ATTORNEY

VEHICLE SUSPENSION ARRANGEMENT

FIELD OF THE INVENTION

This invention relates to a vehicle suspension system and more particularly to a novel compensated camber control system of particular interest for racing cars and other highspeed vehicles.

DESCRIPTION OF THE PRIOR ART

It is well known that when a vehicle accelerates, decelerates, travels over a bump, or rolls on cornering, the tires of the vehicle will not remain perpendicular to the surface of the road unless the vehicle employs suspension means. One of the reasons for having the tires remain perpendicular to the surface of the road is to inhibit uneven wear of the tire tread. However, in racing cars and other high performance vehicles, traction and cornering power are adversely affected by deviation from perpendicularity in curves and during acceleration and braking. Moreover, race cars may be "set up" for a certain degree of camber (departure from tire perpendicularity) as a compromise for various conditions encountered over the extent of a course. This, however, represents a departure from the ideal solution for any given condition. Conventional suspension systems have included various means to solve the camber change problem. One approach was to utilize a linkage arrangement incorporating cams, while another approach employed a linkage cam arrangement with a flexible rubber block. Still another approach included closed double-end hydraulic cylinders to overcome the problem.

However, none of the prior art systems employed have been without their problems, such as wear and tear on the cams, nor have such suspension systems been totally reliable to take the challenging tests of present day racing. In addition, prior art systems have not provided automatic compensated camber control systems for roll conditions that have proven satisfactory under operating conditions.

Furthermore, new types of vehicles are being suggested for particular transportation purposes which may place even more stringent demands on suspension systems than have heretofore been evident in more conventional vehicles. For example, rapid transit public transportation systems have been proposed in which extremely high speed trains would be supported on thin films of air (air bearings) between pads on the cars and the rails. In order for such air bearings to be effective, it is extremely important that the relative spacing between the pads and the rails be precisely maintained. Thus, there is need for providing compensation for deflection and roll in such arrangements so that the effectiveness of the air bearings is not destroyed in normal operating conditions.

Accordingly, it is an object of the present invention to provide a novel suspension system which may provide either positive, negative or neutral camber during operating conditions.

It is a further object of the present invention to provide a novel suspension system which insures that the tires remain perpendicular to the road surface or at some preselecting camber setting during operating conditions.

It is a still further object of the present invention to provide a novel suspension system which insures that the tires remain perpendicular to the road surface when the vehicle accelerates, decelerates and travels over bumps.

It is another object of the present invention to provide a novel suspension system which insures that the tires (or other support members) remain perpendicular to the road surface when the vehicle experiences a roll condition.

It is another object of the present invention to provide a novel suspension system which provides for automatic control of the suspension system during roll.

SUMMARY OF THE INVENTION

In accordance with the objects set forth above, the present invention provides a novel suspension system comprised of a guide plate having a plurality of guideways and being mounted to the body frame of the vehicle, and a linkage arrangement for each tire for allowing first respective variable pivot points to travel to control the camber of each respective tire during acceleration, deceleration or respective tire bumps. The suspension system may also utilize the guide plate for allowing second respective variable pivot points of each linkage arrangement to travel relative to such guide plate to control the camber of each respective tire when the vehicle experiences a roll condition. Other embodiments provide either an open loop or a closed loop control circuit which is connected to the suspension system to provide for automatic control of the suspension system during roll.

Although the invention is disclosed herein in the context of a wheeled vehicle, such as a race car, it will be noted that the principles are applicable to other types of systems which face similar problems and may employ controlled camber suspension systems.

The compensated camber control system in accordance with the invention is a fully independent automotive suspension system. It relies on a modified Scott-Russell type of straight line linkage to maintain the tires in an upright position (perpendicular to the road surface). When the suspension is deflected during bumps, acceleration squats or braking dives, the suspension is rotated about a first pivot point while a second pivot point moves in a first controlled slot. The shape of the slot in which the second point is confined controls the perpendicularity of the wheel. The slot can be designed to give positive, negative or neutral camber. This feature is called deflection compensation.

In addition to this and in accordance with a further aspect of the invention, the suspension also incorporates roll compensation. As the chassis of the vehicle rolls due to any side force, the first pivot point of each linkage is moved by an external linkage or other control mechanism along a second controlled slot similar to the deflection slot (first controlled slot). Again, this roll compensation slot (second slot) can be curved to give any desired camber angle. The input to the roll compensation can be from the driver through the steering mechanism or an external sensor can be used to sense side force or roll and automatically adjust the pivot points. The effect of moving the first pivot point is to always keep the line of action of the first and second controlling pivot points parallel to the road surface (in the case of zero camber), ensuring that the wheel remains in a perpendicular position.

BRIEF DESCRIPTION OF THE DRAWINGS

Additional objects, advantages and characteristic features of the present invention will become readily apparent from the following detailed description of the preferred embodiments of the present invention when taken in conjunction with the accompanying drawings, in which.

DESCRIPTION OF THE PREFERRED EMBODIMENTS

Figure 1:
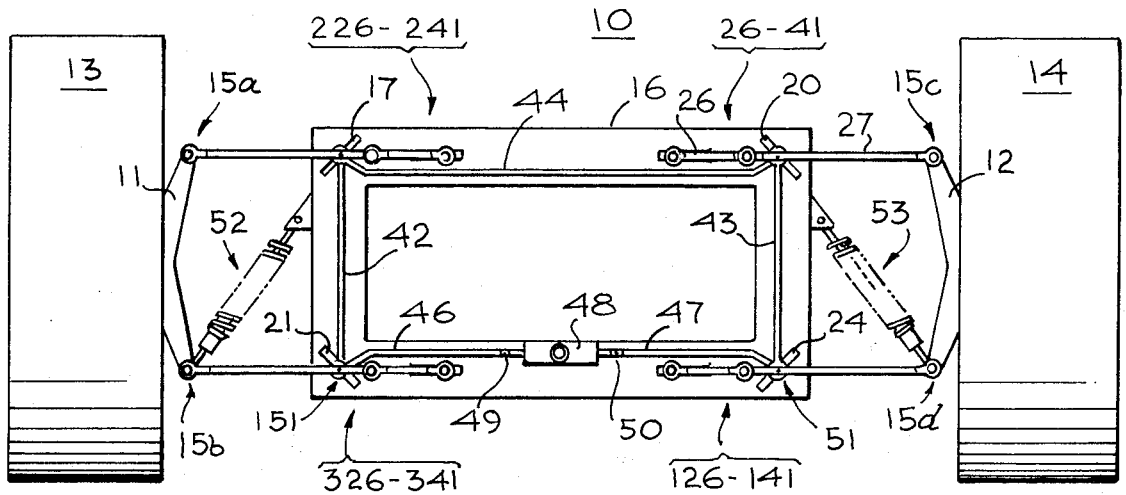
FIG. 1 is a front view of a compensated camber control system in accordance with the present invention.
Figure 2:
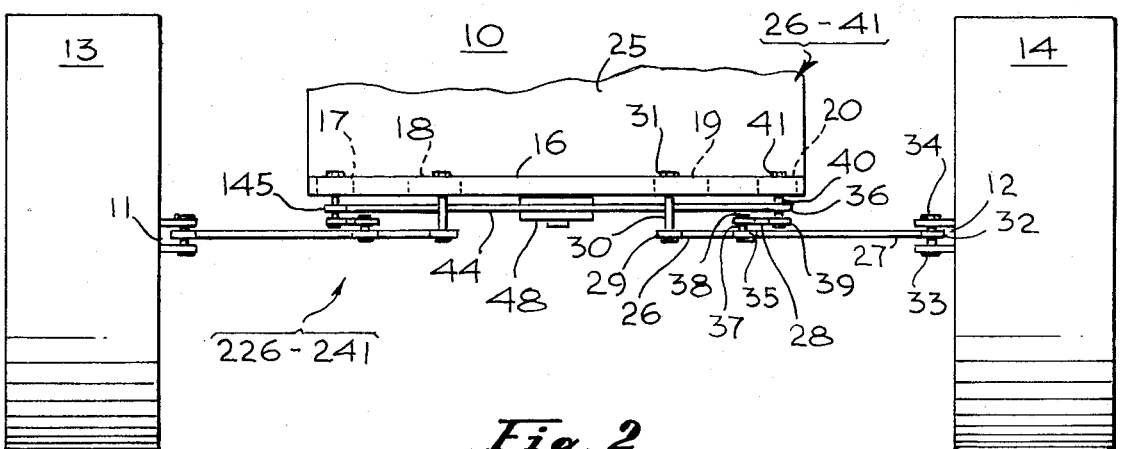
FIG. 2 is a plan view of a compensated camber control system in accordance with the present invention.

Referring now to FIGS. 1 and 2, there are shown front and plan views, respectively, of a particular embodiment of a compensated camber control system 10, in accordance with the present invention. The compensated camber control system 10 is pivotally mounted to a pair of bifurcated wheel mounting members 11 and 12 at points 15a, 15b, 15c and 15d, as shown. The bifurcated wheel mounting members 11 and 12 represent conventional wheel mounting assemblies, such as wheel spindles, spindle blocks and spindle, etc., that would allow a pair of tires 13 and 14 to be mounted, as shown.

Figure 3:
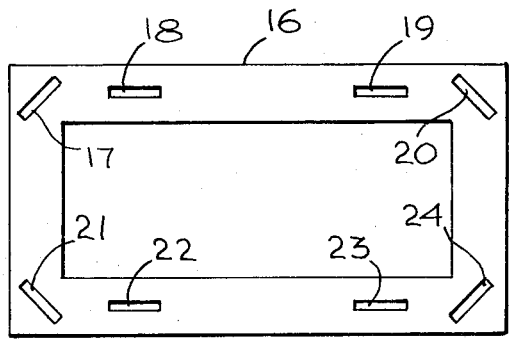
FIG. 3 is a front view of the guide plate of the compensated camber control system in accordance with the present invention.

Referring now to FIG. 3, there is shown a guide plate 16 having a plurality of slots 17 through 24. The slots 17 through 24 may be designed to provide positive, negative or neutral camber, as desired. The slots as shown provide neutral camber. The slots 18, 19, 22 and 23 are perpendicular to the lines 15a–15b and 15c–15d, and the slots 17, 20, 21 and 24 are shown at respective 45° angles to the lines 15a–15b and 15c–15d. The slots 17, 20, 21 and 24 allow the various pivot points of the compensated camber control system 10 to travel along the path described by such slots and allow the guide plate 16 to rotate around various pivot points. Such movements will be described in detail in the later discussion of FIGS. 4–7. The guide plate 16 may be an integral portion of the partially shown frame member 25 or may be retained thereto by conventional means.

Referring now to the upper right-hand corner of FIG. 2, the various linkage members 26 through 41 of the particular compensated camber control system 10 are shown. The linkage members 26 through 41 cooperate with the linkage members 126 through 141 during vertical deflection of the tire 14. Linkage members 226 through 241 cooperate with linkage members 326 through 341 during vertical deflection of the tire 13. The linkage bars 26, 27 and 28, which form part of a modified Scott-Russell linkage arrangement, cooperate with the linkage bars 126, 127 and 128 in a parallel arrangement linked to the slots 19, 20, 23 and 24, to insure, in this particular embodiment, that neutral camber of tire 14 is maintained throughout the operation of the vehicle. For sake of brevity, since the various connections which allow the linkage bars 26, 27 and 28 and the cooperating linkage bars 126, 127 and 128 to control the tire 14 are identical to the corresponding linkage bars 226, 227 and 228, 326, 327 and 328 that control the tire 13, only the various members 29 through 41 will be shown and described in detail.

The inner end of the linkage bar 26 is pivotally mounted to the guide plate 16 by means of an ear 29, a pin 30, a nut 31 and the slot 19. The linkage rod 27 is pivotally mounted at its outer end to the top portion of the bifurcating wheel mounting member 12 by means of an ear 32, a pin 33 and a nut 34. The linkage bar 26 is rigidly connected to the linkage rod 27 by an ear 35. The rigidly connected linkage rods 26 and 27 are pivotally mounted to the linkage bar 28 by means of the ear 35, a pin 37, a nut 38 and an ear 36, which is connected to the linkage bar 28. The outer end of linkage rod 28 is pivotally mounted to the guide plate 16 by means of an ear 39, a pin 40, a nut 41 and the slot 20.

Another embodiment of the present invention is partially shown in FIGS. 1 and 2, namely, the linkage that cooperates with aforementioned parts of the compensated camber control system 10 to control the chamber of the tires 13 and 14 when the vehicle experiences a roll condition. There is shown an upper roll compensation linkage bar 44 which is connected between and fastened to the pins 40 and 240 by means of ears 45 and 245, respectively, as shown. The corresponding roll compensation linkage for the bottom portion of the compensated camber control system 10 is comprised of a pair of roll compensation linkage bars 46 and 47 and a roll compensation actuator 48. This corresponding roll compensation linkage is connected to the rest of the system by ears 51 and 151 and connection means 49 and 50, as shown. One vertical bar 43 extends between the ears 45 and 51, while a corresponding vertical bar 42 extends between the ears 245 and 151 to form a rectangular linkage maintaining the relative positions of the pivot pins 40, 140, 240 and 340 as the pins move in their guide slots during roll of the vehicle. The ears 45, 51, 245 and 151 are 90° ears adapted to attach to both the horizontal and vertical roll linkage bars. A pair of combination spring/shock absorbers units 52 and 53 are shown mounted between the guide plate 16 and the pair of bifurcated wheel mounting members 11 and 12. The means for controlling the roll compensation actuator 48 will be discussed in detail in the later discussion of FIGS. 8 and 9.

Figure 4:
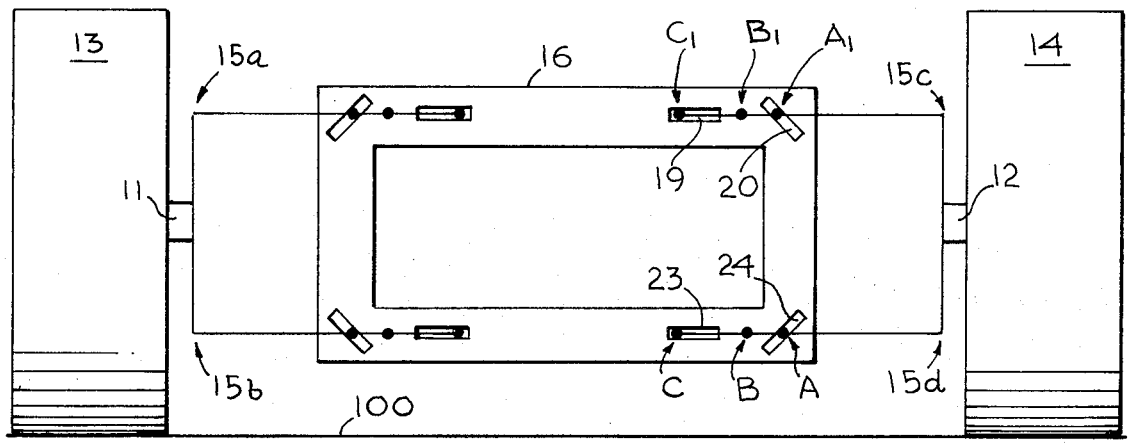
FIG. 4 is a schematic arrangement of the compensated camber control system in a rest position in accordance with the present invention.

Referring now to FIGS. 4, 5, 6 and 7, there are shown schematic arrangements of the compensated camber control system 10 (with roll compensation linkage bars omitted for simplicity of representation) in various alignments under normal operating conditions encountered in the operation of a vehicle on a road surface 100. FIG. 4 illustrates the positions of the pivot points A, B and C when the vehicle is in a rest position, or in a position where no roll or vertical deflection (bounce, dive or squat) is being experienced by the vehicle. Pivot point A is located midway between the opposite ends of the slot 24 and pivot point C is located at the left end of the slot 23. The pivot point B is shown located along a line formed by the pivot points A and C. Assuming zero camber, the line defined by points $15c$ and $15d$, and in turn the tire 14, will be perpendicular to the road surface 100. Thus, the pivot point C and pivot point A form a straight line which is parallel to the road surface 100. Pivot points $A_1$, $B_1$, and $C_1$ of the top right portion of the compensated camber control system 10 are shown in their corresponding relative positions.

Figure 5:
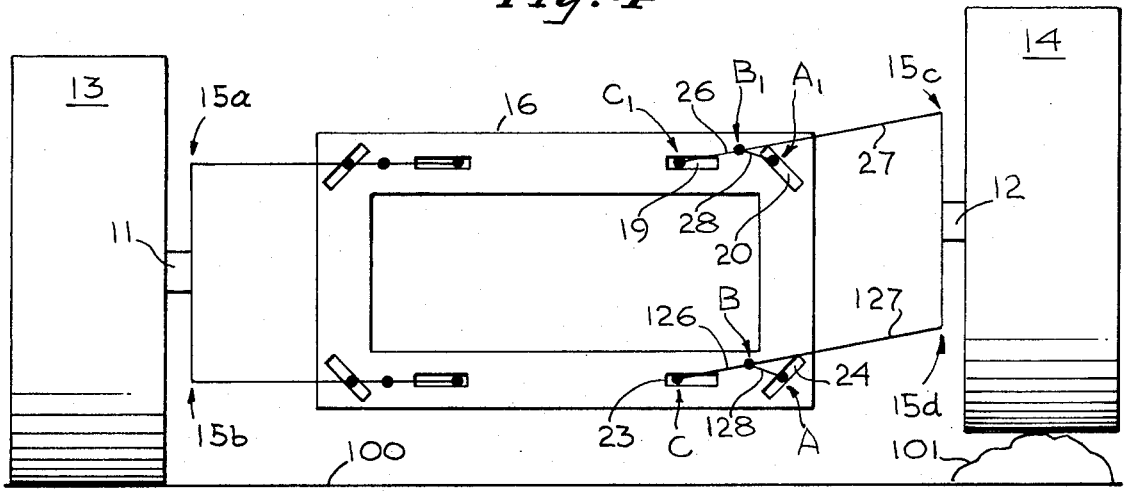
FIG. 5 is a schematic arrangement of the compensated camber control system in a bounce condition in accordance with the present invention.

Referring now to FIG. 5, the tire 14 is shown undergoing a vertical deflection. The tire 14 is shown on the top of a bump 101 of the road surface 100. In order to maintain the vehicle in a level relationship with the road surface 100, the pivot points C and $C_1$ will travel to the right in slots 23 and 19, respectively. Concurrently with the movement of the pivot points C and $C_1$ to the right, the pivot points A and $A_1$ will remain stationary and the pivot points B and $B_1$ will travel in their respective arcs, as shown. Thus, the above described portion of the compensated camber control system 10 compensates for the bounce effect to maintain the tire 14 perpendicular to the road surface 100, because the respective lines formed by pivot points A and C and corresponding pivot points $A_1$ and $C_1$ allow the line defined by the points $15c$ and $15d$ to remain perpendicular to the road surface 100. Similar operation occurs in acceleration squats and braking dives.

Figure 6:
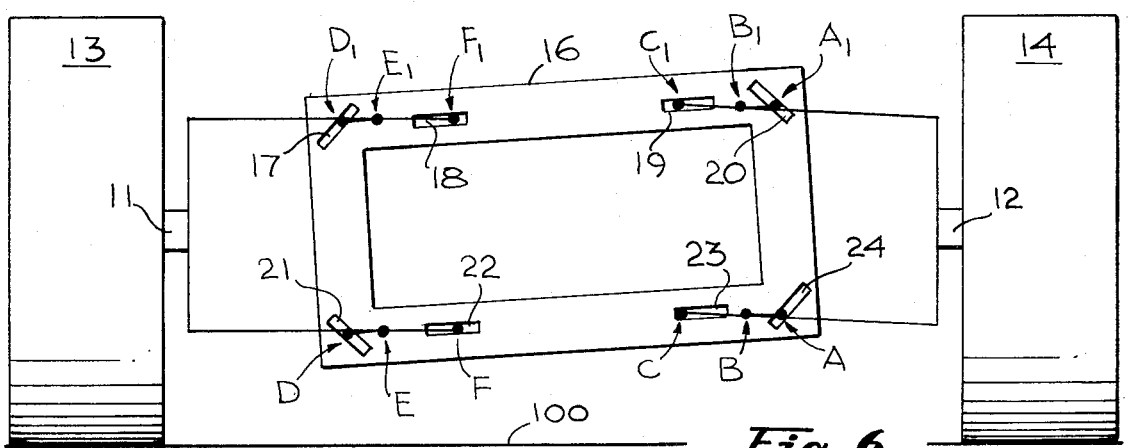
FIG. 6 is a schematic arrangement of the compensated camber control system in a roll condition in accordance with the present invention.

Referring now to FIG. 6, the vehicle is shown undergoing a roll condition. The right side of guide plate 16 is shown rising in response to forces exerted upon the vehicle in cornering. In order to maintain the tire 14 at zero camber with respect to the road surface 100, the slots 24 and 20 allow the aforementioned respective straight lines formed by the pivot points A and C and $A_1$ and $C_1$ to remain in a parallel relationship with the road surface 100 because the right side of the guide plate 16 is allowed to travel upward relative to pivot points A and $A_1$. On the other hand, the pivot points D, $D_1$ and F, $F_1$ of the left side of the compensated camber control system 10 form their respective straight lines, which are parallel to the road surface 100 by means of the slots 17 and 21 which move downward relative to pivot points D and $D_1$. Thus, as in the bounce condition described in connection with FIG. 6, the line defined by the points $15c$ and $15d$, along with the line defined by the points $15a$ and $15b$, remains perpendicular to the road surface 100.

Figure 7:
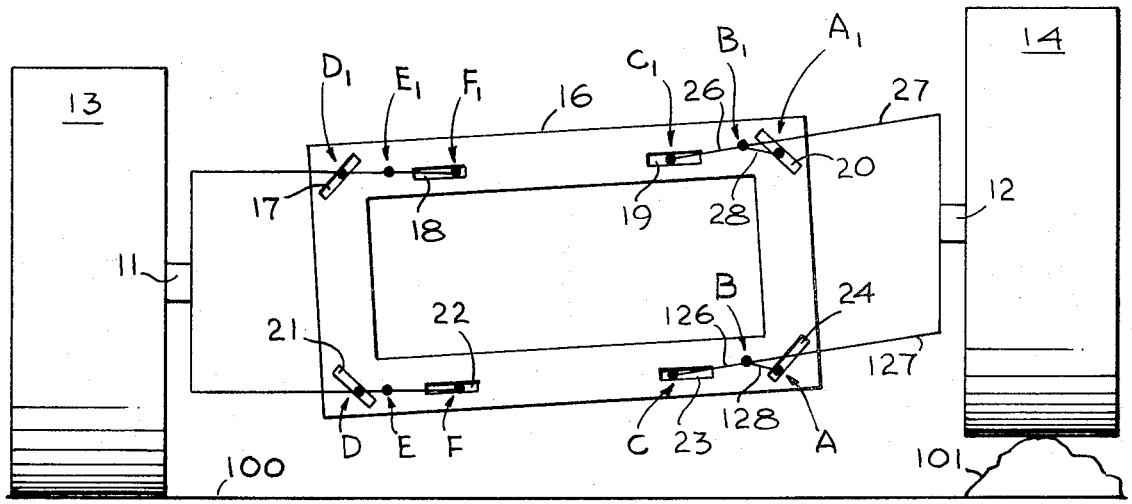
FIG. 7 is a schematic arrangement of the compensated camber control system in a roll and bounce condition in accordance with the present invention.

Referring now to FIG. 7, the vehicle is shown undergoing both roll and bounce conditions. The tire 14 is shown on top of a bump 101 of the road surface 100 and the right side of the guide plate 16 is shown rising in response to the forces exerted upon the vehicle in cornering. In order to maintain the tire 14 at zero camber with respect to the road surface 100, the pivot points C and $C_1$ will travel to the right in slots 23 and 19, respectively, and the slots 24 and 20 move relative to their respective pivot points A and $A_1$. Concurrently, the pivot points F and $F_1$, will travel to the left in slots 22 and 18, respectively, and the slots 21 and 17 move relative to their respective points D and $D_1$. Thus, the respective lines defined by the points $15c$ and $15d$ and the points $15a$ and $15b$ remain perpendicular to the road surface.

Figure 8:
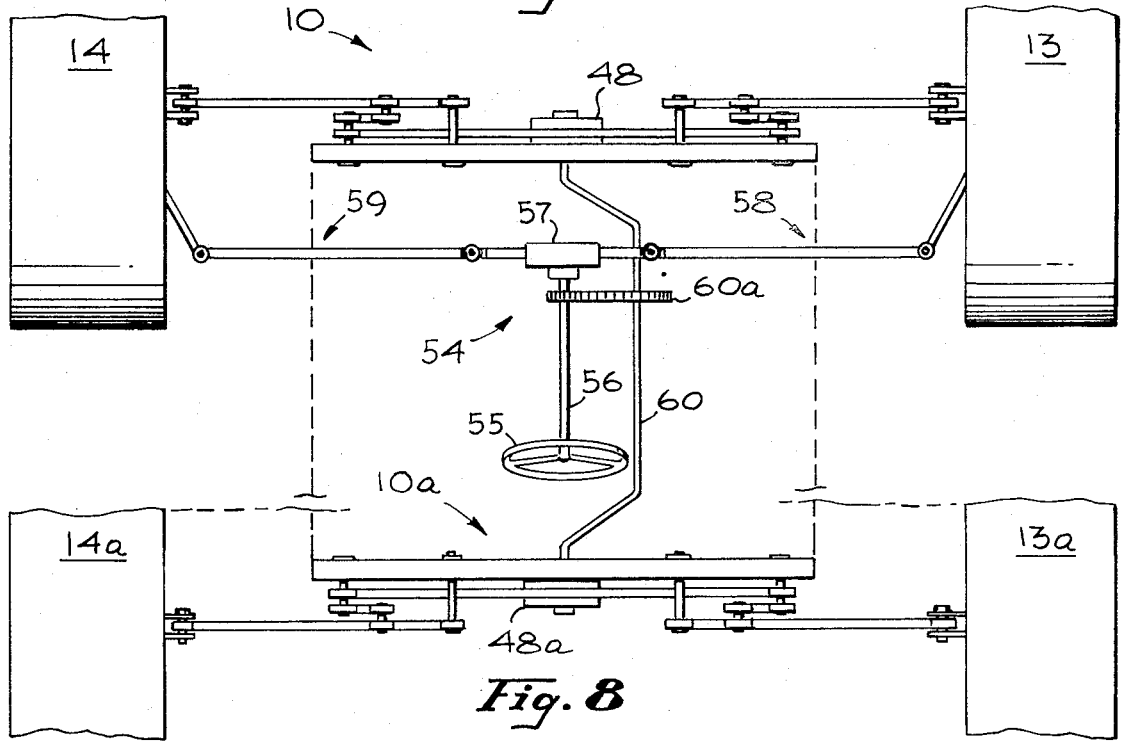
FIG. 8 is a plan view of a compensated camber control system mounted to both sets of tires and illustrating an open loop control circuit for the compensated camber control system in accordance with the present invention.

Referring now to FIG. 8, there is shown a compensated camber control system 10 located between the tires 13 and 14 and mounted on the bifurcated wheel mounting members 11 and 12, and an identical compensated camber control system $10a$ which is located between the tires $13a$ and $14a$ and mounted to a pair of bifurcated wheel mounting members $11a$ and $12a$. A conventional steering system 54 is shown comprised of a steering wheel 55, a steering shaft 56, and a conventional steering box 57 mounted between right-side steering linkage 58 and left-side steering linkage 59, which are respectively mounted to the wheel assembly of the tires 13 and 14. The numeral 60 designates a roll shaft, either flexible or solid which, in the embodiment shown, is connected to the steering shaft 56 by means of a chain-and-sprocket arrangement $60a$. If desired the coupling $60a$ may be replaced by a variable drive mechanism to account for variations in mass or velocity or both (the parameters affecting centrifugal force). Other alternative arrangements may also be used.

As shown, the front and rear ends of the roll shaft 60 are connected to the roll compensation actuators 48 and $48a$, which may be a rack-and-pinion assembly or a recirculating ball assembly which will convert the rotary motion into linear motion to drive the pivot points A, $A_1$, D and $D_1$ of the compensated camber control system 10, as shown in FIG. 7. Thus, when the vehicle is cornering and a roll condition is experienced, the wheel 55 is rotated such that the chain and sprocket assembly $60a$ drives the roll shaft 60, which in turn drives the roll compensation actuators 48 and $48a$ to position the aforementioned pivot points to correct for roll. The amount of the steering wheel lock may be set in some proportion to the amount of roll. The desired amount of such proportion may be set in the roll compensation actuators 48 and $48a$.

Figure 9:
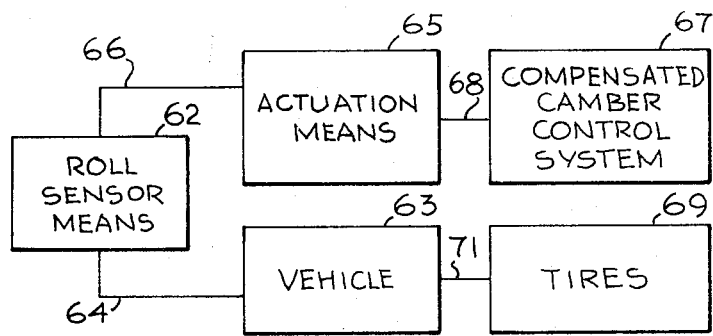
FIG. 9 is a block diagram of a closed loop circuit for controlling a compensated camber control system in accordance with the present invention.

Referring now to FIG. 9 there is shown a block diagram of a closed loop circuit 61 for controlling the compensated camber control system 10 that was described in the discussion of FIGS. 1–8. The closed loop circuit of this embodiment would be similar to the open loop circuit of FIG. 8, except that a roll sensor means 62 replaces that portion of the steering mechanism that supplies the input to the roll shaft 60. The roll sensor means 62 would be suitably mounted on the vehicle 63, and when the vehicle 63 is in a non-roll state, the roll sensor 62 would be adjusted to a null position. The line 64 represents any difference in roll orientation between the roll sensor means 62 and the vehicle 63. The output of the roll sensor means 62 would be connected to actuation means 65 by suitable means as represented by the line 66. In turn, the output of the actuation means 65 would be connected to a compensated camber control system 67 via suitable means as represented by the line 68, and the output of the compensated camber control system 67 would be connected to the tires 69 via suitable means as represented by the line 70. The line 71 represents any difference in normal orientation between the tires 69 and the vehicle 63.

Various types of sensing devices may be utilized as the roll sensor means 62, e.g., accelerometers, pendulums, etc. In a fluid system, the actuation means 65 may be a pump or a blow-down tank to control a cylinder. The cylinder in turn would drive the roll compensation linkage of the compensated camber control system 67 as practiced by this invention. On the other hand, in an electromechanical system the actuation means 65 may include an electronic control to control a servo motor which would drive the roll compensation linkage of the compensated camber control system 67.

In the operation of the vehicle 63, if a roll condition is experienced, the roll sensing means 62 would sense such roll condition and would attempt to compensate for it. The roll sensing means 62 would supply an input to the actuation means 65 which would in turn drive the compensated camber control system 67 to position the pivot points A, $A_1$, D and $D_1$, as shown in FIG. 7, to correct for roll.

Referring now to FIGS. 10a through 10d, there are shown various slot orientations that may be incorporated in the guide plate 16 of FIG. 3 to allow the compensated camber control system 10 to provide for non-linear neutral camber. As discussed earlier, the slots 17–24 of the guide plate 16 may be designed to provide for either positive, negative or neutral camber. If non-linear camber is desired during vertical deflection of a tire, the slot retaining the pivot point C must be repositioned from its alignment of FIG. 3. On the other hand if non-linear camber is desired during a roll condition, the slot retaining the pivot point A must be repositioned from its alignment of FIG. 3.

Figure 10A:
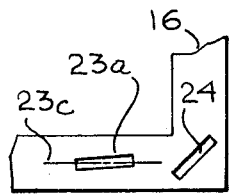
FIGS. 10a–10d illustrate various slot orientations that may be incorporated in the guide plate of the compensated camber control system to provide for non-linear neutral camber, in accordance with the present invention.
Figure 10B:
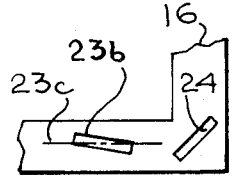

Referring now to FIGS. 10a and 10b, the slot 23 is shown repositioned to provide the suspension system with nonlinear camber during a bounce, or other vertical deflection, condition. The centerline of the slot 23 of FIG. 3 is shown as a dashed line 23c in FIGS. 10a and 10b. In FIG. 10a, the slot 23 is repositioned to a slanted position with its inner end being lower than its outer end to form a slot 23a in order to provide for positive camber during bounce and negative camber during rebound. The center of the inner end is located on the dashed line 23c, and the center of the outer end is located above the dashed line 23c. On the other hand, in FIG. 10b, the slot 23 is repositioned to a reverse of the slant of slot 23a to form a slot 23b in order to provide for negative camber during bounce and positive camber during rebound. The center of the inner end is located on the dashed line 23c, and the center of the outer end is located below the dashed line 23c.

While the new slots 23a and 23b are shown as having straight paths, it should be understood that such paths may be curved paths. Thus, the pivot point C is allowed to travel the described path during a bounce condition to provide the desired camber. It should be understood that while it has not been shown, the other three slots corresponding to slot 23, would be inclined with respect to their linkage arrangement to provide similar camber during bounce and rebound.

Figure 10C:
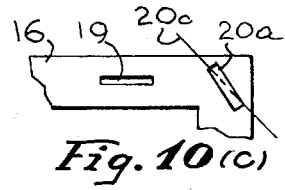
Figure 10D:
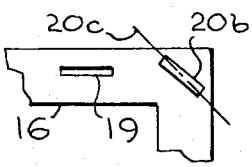

Referring now to FIGS. 10c and 10d, the slot 20 is shown repositioned to provide the suspension system with nonlinear camber during a roll condition. The centerline of the slot 20 of FIG. 3 is shown as a dashed line 20c in FIGS. 10c and 10d. All four slots of the slots 18, 19, 22 and 23 are similarly repositioned to provide respective similar camber during bounce and rebound in the embodiments of FIGS. 10a and 10b.

In FIG. 10c, the slot 20 is repositioned to a slanted position with its angle to the vertical being decreased from the 45° angle of FIG. 3 to form a slot 20a in order to provide positive camber on the inside wheel and negative camber on the outside wheel of the vehicle upon cornering. In FIG. 10d, the slot 20 is repositioned to a slanted position with its angle to the vertical being increased from the 45° angle of FIG. 3 to form a slot 20b in order to provide negative camber on the inside wheel and positive camber on the outside wheel of the vehicle upon cornering. While the new slots 20a and 20b are shown as having straight paths, it should be understood that such paths may be curved paths.

Figure 11A:
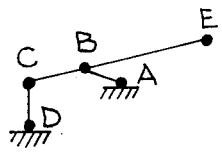
FIGS. 11a, 11b, and 11c are schematic diagrams illustrating parameters relevant to the design of embodiments employing the invention.
Figure 11B:
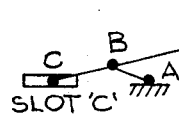
Figure 11C:
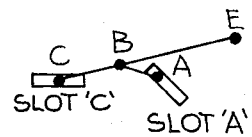

As an example of a method of determining quantitatively the relationship between the shape of the slots and the wheel camber angle, reference is made to the schematic diagrams of FIGS. 11a, 11b and 11c. These correspond generally to the upper right-hand linkage of FIGS. 4–7. As has been pointed out, the shape of slot C can be generated to give perfect straight line motion or non-linear camber during bump and rebound. For example, if neutral camber is desired at the null (undeflected) position, 2° negative camber at full bump and full rebound, the following procedure would be used:

For convenience, suppose 17 inches is chosen as a desired overall linkage length (CE) and 5 inches is chosen as the distance (BC) to the pivot point B. Using the Scott-Russell relationship ($AB/BC = BC/BE$) this results in a 2 1/12 inch pivot link (AB).

If the link CD is effectively extended to infinity, i.e., replaced with a slot, the motion of E becomes a straight line perpendicular to a line of action between the slot and pivot point A. This will only be so if the slot is straight (centerline intersects A). If a different action is required (in this case, 2° negative camber when deflected), the slot must be angled or curved. If the slot is angled upwards (end closest to the car centerline is lowest), the suspension will experience positive camber during bounce and negative camber during rebound. If the slot is angled downwards, the opposite effect is experienced (negative on bounce to positive on rebound).

The shape of slot A (FIGS. 4–7) can be curved to give perfect straight line motion or non-linear camber during roll. Neutral camber can be maintained during roll by shaping slot A in an arc of a circle which has its center at the roll center of the car. For most applications, a 45° angle can be used to approximate neutral camber for small roll deflections. An effect similar but opposite in direction to that seen on slot C is true for slot A. If the angle of the slot is raised upwards (end closest to the car centerline is highest) for the upper link (converse for lower slot), the suspension will experience positive camber on the inside wheel and negative camber on the outside wheel. If the angle of the slot (upper link) is lowered, the suspension will experience negative camber on the inside wheel and positive camber on the outside wheel.

The relationship between the shape of the slots and the wheel camber angle cannot be related in simple algebraic terms. Because of the action of the pivot link ($A\vec{B}$), the relationship is a non-linear differential equation. The desired solution for a given set of conditions can readily be worked out on a computer, taking account of the discussion herein. If a camber other than neutral is desired, it is more convenient to change the linkage ratio than the angle of the slots. The camber can be biased by changing the link ratio from $AB/BC = BC/BE$ to $(AB + X)/BC = BC/BE$ for negative camber and $(AB - X)/BC = BC/BE$ for positive camber, X being the distance by which the link AB is lengthened or shortened.

There are many possible combinations of modifications. Angled slots could be used for a camber bias in roll while the linkage ratio could be modified to give a camber bias in bounce and rebound. In addition, the system supplying input to the roll compensation linkage could be biased so that pivot point A leads or lags the neutral camber position, causing the camber to be biased accordingly.

Thus, although the present invention has been shown and described with reference to particular embodiments, for example, a compensated camber control system mounted between a pair of bifurcated wheel mounting members, nevertheless various changes and modifications obvious to a person skilled in the art to which the invention pertains, for example, a compensated camber control system mounted between other types of wheel mounting means, are deemed to be within the contemplation of the invention. Also a variation of the roll compensation system as shown may be provided in which the roll sensor means 62 of FIG. 9 comprises a gyroscope mechanism which senses rotation of the vehicle, either as yaw or roll. In versions of the system installed on wheeled vehicles, the wheels themselves may develop the gyroscopic effect, in which case the roll compensation system may be self-actuating to automatically adjust the pivot point positions within the roll compensation guide slots as soon as rotation of the wheel axis is encountered. These and other equivalent arrangements are considered to be within the scope of the appended claims.

What is claimed is:

1. A vehicle suspension system for controlling the orientation of vehicle support members relative to a road surface comprising:
   guide means mounted on said vehicle for providing a plurality of slotted guideways defining the paths of linkage means pivotally mounted thereto;
   vehicle support mounting means;
   linkage means extending through said plurality of guideways of said guide means and being pivotally mounted between said guide means and said support mounting means, said linkage means having at least two movable members linked together in pairs at a common pivot point for controlling the orientation of said support mounting means; and
   control means for controlling the position of respective linkage means relative to the guide means.

2. A suspension system as recited in claim 1 wherein said linkage means comprises:
   a first movable member having a first end and a second end, said first end being pivotally mounted to said guide means through a first guideway of said guide means;
   a second movable member having a first end and a second end, said first end being pivotally mounted to said support mounting means, said second end of said second member being rigidly connected to said second end of said first member; and
   a third movable member having a first end and a second end, said first end being pivotally mounted to said guide means through a second guideway of said guide means, and said second end of said third member being pivotally mounted to said rigidly connected second ends of said first and second members.

3. A suspension system as recited in claim 2 wherein the linkage means are controlled such that during the static condition of said vehicle, the path of travel of the linkage means extending through said first guideway of said guide means is normal to the vertical orientation of said mounting means and the path of travel of the linkage means extending through said second guideway of said guide means is at a 45° angle to said vertical orientation of said mounting means.

4. A suspension system as recited in claim 3 wherein during a vertical deflection of said mounting means, said first end of said first member travels along said path of said first guideway of said guide means, said third member rotates within said second guideway of said guide means, and said second member rotates around said mounting means to ensure that said mounting means travels in a rectilinear path.

5. A suspension system as recited in claim 3 wherein during a roll condition of said vehicle, said first member rotates within said first guideway of said guide means and said first end of said third member travels along said path of said second guideway relative to said guide means to ensure that said mounting means retains its vertical orientation.

6. A suspension system as recited in claim 3 wherein during a combined vertical deflection of said mounting means and a roll condition of said vehicle, said first end of said first member travels along said path of said first guideway relative to said guide means and said first member rotates within said first guideway of said guide means, said first end of said third member travels along said path of said second guideway relative to said guide means and said third member rotates within said second guideway of said guide means, and said second member rotates around said mounting means to ensure that said mounting means retains its vertical orientation and travels in a rectilinear path.

7. A suspension system as recited in claim 2 wherein the linkage means are controlled such that during the static condition of said vehicle, said first end of said first member and said first end of said third member define a line normal to the vertical orientation of said mounting means, the path of travel of the linkage means extending through said first guideway of said guide means is inclined at an angle relative to said normal line, the end of said first guideway nearest said mounting means being above said normal line and the other end of said first guideway being located within said normal line, and the path of travel of the linkage means extending through said second guideway of said guide means is at a 45° angle to said vertical orientation of said mounting means, the end of said second guideway nearest said mounting means being above the other end of said second guideway.

8. A suspension system as recited in claim 7 wherein during deflection of said mounting means, said first end of said first member travels along said path of said first guideway of said guide means, said third member rotates within said second guideway of said guide means, and said second member rotates around said mounting means to provide a positive camber to said mounting means during one selected portion of said deflection and a negative camber during a different selected portion of said deflection.

9. A suspension system as recited in claim 8 wherein the path of said first guideway of said guide means is a straight line.

10. A suspension system as recited in claim 8 wherein the path of said first guideway of said guide means is a curved line.

11. A suspension system as recited in claim 2 wherein the linkage means are controlled such that during the static condition of said vehicle, said first end of said first member and said first end of said third member define a line normal to the vertical orientation of said mounting means, the path of travel of the linkage means extending through said first guideway of said guide means is inclined at an angle relative to said normal line, the end of said first guideway nearest said mounting means being below said normal line and the other end of said first guideway being located within said normal line, and the path of travel of the linkage means extending through said second guideway of said guide means is at a 45° angle to said vertical orientation of said mounting means, the end of said second guideway nearest said mounting means being above the other end of said second guideway.

12. A suspension system as recited in claim 11 wherein during a deflection of said mounting means, said first end of said first member travels along said path of said first guideway of said guide means, said third member rotates within said second guideway of said guide means, and said second member rotates around said mounting means to provide negative camber to said wheel mounting means during one selected portion of its deflection and positive camber during another selected portion of its deflection.

13. A suspension system as recited in claim 12 wherein the path of said first guideway of said guide means is a straight line.

14. A suspension system as recited in claim 12 wherein the path of said first guideway of said guide means is a curved line.

15. A suspension system as recited in claim 1 wherein said linkage means comprises:

a first member having a first end, a second end, and an opening within said first member located between said first end and said second end, said first end being pivotally mounted to said guide means through a first guideway of said guide means, said second end being pivotally mounted to said mounting means; and a second member having a first end and a second end, said first end being pivotally mounted to said guide means through a second guideway of said guide means, and said second end being pivotally mounted to said first member at said opening of said first member.

16. A vehicle suspension system as recited in claim 1 wherein said linkage means comprises sets of pairs of said movable members, each set extending between the guide means and one of the support mounting means in a parallel bar linkage.

17. A vehicle suspension system in accordance with claim 16 wherein said controll means includes means for varying the position of the linkage means relative to the guideways of the guide means while the vehicle is in operation.

18. A vehicle suspension system in accordance with claim 17 wherein said position varying means includes means for controlling at least two of said sets of pairs in unison.

19. A vehicle suspension system in accordance with claim 17 wherein said position varying means includes means for controlling the sets at different locations on said vehicle in unison in order to provide related control of the support mounting means over the extent of the vehicle.

20. A vehicle suspension system as recited in claim 17 wherein each respective support mounting means includes a top arm and a bottom arm, one movable member of each said pair of movable members is located above the other movable member of each said pair, the upper said movable member of a pair being pivotally mounted to the respective top arm of its corresponding support mounting means, and the lower said movable member being pivotally mounted to the respective bottom arm of its corresponding support mounting means such that the upper and lower movable members of said pairs move in unison during a vertical deflection of their corresponding support mounting means, and wherein the position varying means comprise generally vertical and generally horizontal linking members secured together in a generally rectangular con-figuration for causing the paths of travel of the linkage means within certain of said guideways to be controlled in linked relationship during a roll condition.

21. A vehicle suspension system as recited in claim 20 wherein said position varying means includes a roll compensation actuator and said vehicle includes a steering mechanism and connecting means for connecting said steering mechanism to said roll compensation actuator.

22. A vehicle suspension system as recited in claim 21 wherein said roll compensation actuator includes rack and pinion means for converting rotary motion into linear motion, said steering mechanism includes a steering shaft, and said connecting means includes a roll shaft and a mechanical coupling assembly, said roll shaft being connected to said roll compensation actuator, said mechanical coupling assembly being connected to said steering shaft and operative with said steering shaft and said roll shaft to transfer the rotation of said steering shaft to said roll compensation actuator.

23. A vehicle suspension system as recited in claim 22 for a vehicle having a plurality of pairs of support means along its length and further including corresponding portions of said system for each pair of support means, and means connecting the roll compensator actuators of a least two of said corresponding system portions together to said roll shaft for common control thereby.

24. A vehicle suspension system as recited in claim 20 wherein said position varying means includes a roll compensation actuator and said vehicle includes a steering mechanism, said vehicle further including a second pair of support means and a second suspension system portion mounted between said second pair of support means, position varying means of said second system portion including a roll compensation actuator, and further including sensing means for sensing any roll of said vehicle and means connected between the respective roll compensation actuators and the roll sensing means for driving said suspension system to correct for such roll.

25. A vehicle suspension system comprising:
a frame;
vehicle support mounting means;
linkage means extending between the frame and the support mounting means to permit relative movement between the frame and the support mounting means in a controlled fashion during operation of the vehicle; and
means for controlling the linkage means relative to the frame so as to limit the relative movement between the support mounting means and the frame in a fashion to provide both roll and deflection compensation, the linkage controlling means including a symmetrical arrangement of slots fixed relative to the frame for guiding the motion of the linkage means.

26. A vehicle suspension system in accordance with claim 25 further including means for controlling the position of the linkage members relative to said slots in accordance with operating positions of the vehicle.

27. A vehicle suspension system in accordance with claim 25 wherein said slots are angularly disposed so as to provide neutral camber through the extent of relative movement between the support means and the frame.

28. A vehicle suspension system in accordance with claim 25 wherein some of said slots are angled to develop a variable camber through the extent of relative movement between the support means and the frame.

29. Apparatus in accordance with claim 25 wherein said control means comprises means responsive to the vehicle steering mechanism for locating the linkage means within said slots in response to actuation of the steering mechanism.

30. Apparatus in accordance with claim 25 wherein selected ones of said slots are aligned with predetermined respective angles of inclination to control the relative movement between the support mounting means and the frame in a manner to compensate for roll of said vehicle.

31. Apparatus in accordance with claim 31 wherein said angles of inclination are established at 45° to maintain neutral camber for both inside and outside support mounting means during cornering of said vehicle.

32. Apparatus as recited in claim 32 wherein said respective angles of inclination are more than 45° in order that on cornering of said vehicle, the suspension system provides positive camber on the inside support mounting means and negative camber on the outside support mounting means.

33. Apparatus as recited in claim 32 wherein said respective angles of inclination are less than 45° in order that on cornering of said vehicle, the suspension system provides negative camber on the inside support mounting means and positive camber on the outside support mounting means.

34. Apparatus in accordance with claim 25 wherein said control means comprises gyroscopic means mounted to the vehicle for controlling the position of the linkage means relative to said slots upon rotation of the vehicle.

35. Apparatus in accordance with claim 35 wherein the support mounting means comprises wheels, and wherein said gyroscopic means includes at least one of said wheels.

36. A vehicle suspension system as recited in claim 17 wherein said position varying means includes a roll compensation actuator and said vehicle includes a steering mechanism and connecting means for connecting said steering mechanism to said roll compensation actuator.

* * * * *